United States Patent [19]
Brooks

[11] Patent Number: 5,015,545
[45] Date of Patent: May 14, 1991

[54] METHOD AND APPARATUS FOR COOLING AN ARRAY OF RECHARGEABLE BATTERIES

[75] Inventor: Alec N. Brooks, Pasadena, Calif.

[73] Assignee: General Motors Corporation, Detroit, Mich.

[21] Appl. No.: 460,313

[22] Filed: Jan. 3, 1990

[51] Int. Cl.⁵ .......................................... H01M 10/50
[52] U.S. Cl. .................................... 429/99; 429/120; 180/68.5
[58] Field of Search ................. 429/120, 99; 180/68.5, 180/68.1

[56] References Cited

U.S. PATENT DOCUMENTS

| | | | |
|---|---|---|---|
| 1,313,512 | 8/1919 | Bedell et al. | 429/120 |
| 4,135,593 | 1/1979 | Fowkes | 180/68.5 |
| 4,216,839 | 8/1980 | Gould et al. | 180/68.5 |

FOREIGN PATENT DOCUMENTS

| | | | |
|---|---|---|---|
| 0609147 | 5/1978 | U.S.S.R. | 429/120 |
| 0864390 | 9/1981 | U.S.S.R. | 429/120 |

Primary Examiner—Donald L. Walton
Attorney, Agent, or Firm—Pretty, Schroeder, Brueggemann & Clark

[57] ABSTRACT

A housing for carrying a plurality of rechargeable batteries is configured such that air gaps defined adjacent to the batteries have a continuously-decreasing cross-sectional area. Cooling air being directed through the air gaps thus increases its speed in inverse relationship with its temperature rise such that all of the batteries are cooled to substantially the same degree. All of the cells of the batteries thereby accept electrical charge at a substantially uniform rate.

20 Claims, 2 Drawing Sheets

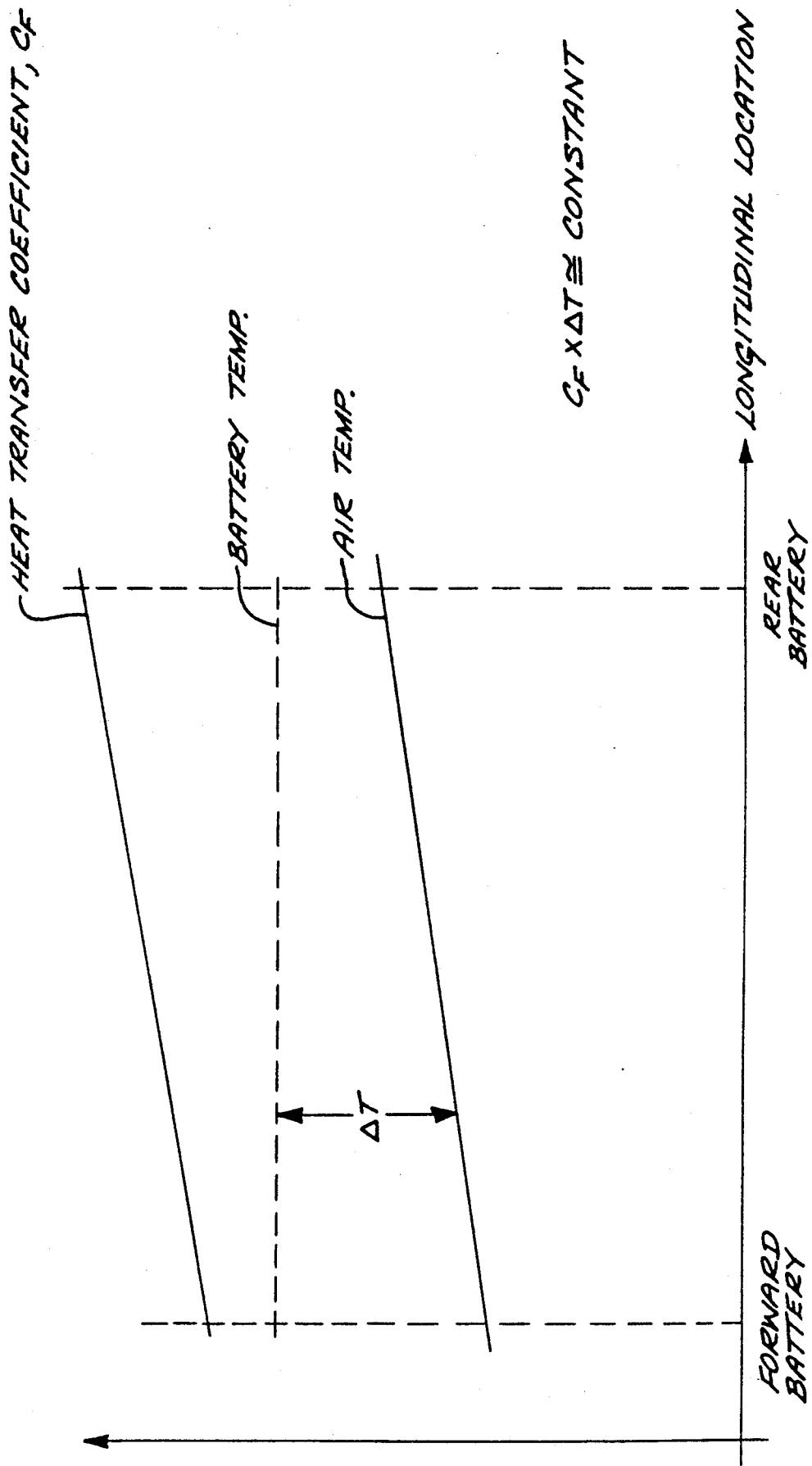

METHOD AND APPARATUS FOR COOLING AN ARRAY OF RECHARGEABLE BATTERIES

BACKGROUND OF THE INVENTION

This invention relates generally to apparatus for housing an array of rechargeable batteries and, more particularly, to apparatus for cooling the batteries while they are being recharged or discharged.

Arrays of rechargeable batteries are enjoying increased use as sources of electrical power for a variety of devices, such as electric vehicles. Such arrays typically include a large number of separate batteries, connected together in series to provide voltages in the range of 100 to 400 volts. In the case of an electric vehicle, it is desirable to locate the batteries in a row within an elongated, tubular housing or tunnel extending centrally along the vehicle's length.

One commonly used battery is the lead-acid battery. During recharging, lead-acid batteries can generate substantial heat, which must be dissipated to prevent the batteries from being damaged. Other batteries, such as nickel-zinc batteries, generate heat during discharge, which likewise must be dissipated to prevent damage.

One technique for dissipating this heat is to size the battery housing to be slightly wider than the batteries array, so as to define a uniform air gap between the housing and the batteries, and to blow air through that air gap, from the housing's forward end to its rearward end. The housing's forward end is preferably located at the forward end of the vehicle. One disadvantage inherent in this means for cooling the batteries is that the batteries located near the housing's forward end are cooled to a substantially greater degree than are the batteries located near the housing's rearward end, due to the heating of the cooling air as it moves past the batteries. This is undesirable, because the ability of many batteries (e.g., lead-acid batteries) to accept a charge varies with temperature, and a temperature variation among the separate cells of the batteries therefore means that some cells will charge more rapidly than others. If the batteries are not uniformly charged, then some of them will discharge before others, leading to the possibility that those batteries will be excessively discharged, and thereby damaged.

It should therefore be appreciated that there is a need for an inexpensive cooling system that is adapted to maintain an array of rechargeable batteries at a more uniform temperature during discharging or recharging. The present invention fulfills this need.

SUMMARY OF THE INVENTION

This invention relates generally to apparatus and related methods for cooling an array of rechargeable batteries, to maintain the batteries at a substantially more uniform temperature across the array than was previously achievable. The apparatus includes a housing having a forward end and a rearward end and sized to carry a plurality of rechargeable batteries of predetermined size. The housing is sized to define an air gap between itself and all of the batteries, and air cooling means are provided for transporting air through the air gap, from the housing's forward end to its rearward end. In accordance with the invention, the air gap is defined to have a cross-sectional size that decreases from the housing's forward end to its rearward end, such that the speed of the air being transported through it increases as it moves rearwardly. This enhances the air's cooling coefficient in inverse relationship with the temperature differential between the air and the adjacent batteries. A more uniform cooling effect is thereby provided along the length of the housing, without the need for any supplemental structure or substantial cost.

In a more detailed feature of the invention, the housing is adapted to carry batteries of substantially identical size and shape arranged in a plurality of side-by-side rows, with air gaps being defined between the rows and between the two end-most rows and the adjacent housing. All of these air gaps have cross-sectional air gaps that decrease from the housing's forward end to its rearward end, such that air moving through the gaps increases in speed as it moves rearwardly.

In another feature of the invention, each battery includes a plurality of cells, and the housing is arranged such that each cell of each battery is exposed to the air gap(s) by substantially the same amount. This further ensures that the battery cells are all cooled by substantially the same amount. This cooling arrangement can be provided using foam rubber strips extending from the housing to the plurality of batteries at selected locations on the batteries.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 5 is a graph (not to scale) depicting the rise in temperature (not to scale) of the air being transported through the elongated housing and the correspondingly increasing heat transfer coefficient.

DESCRIPTION OF THE PREFERRED EMBODIMENT

Figure 1:
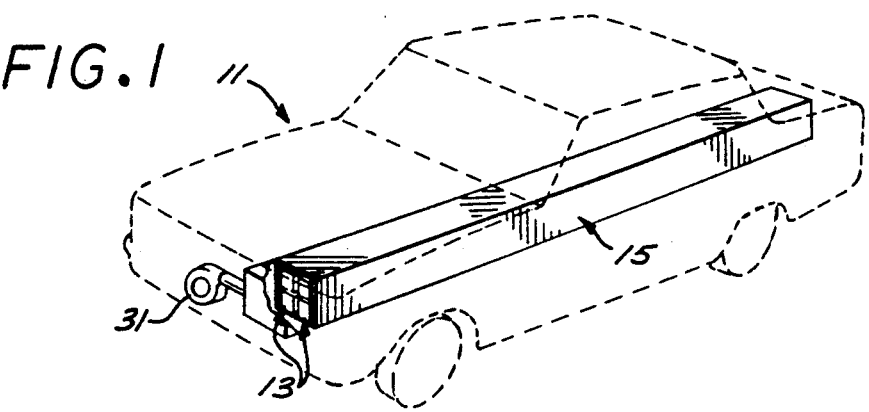
FIG. 1 is a perspective view of an electric vehicle having an elongated, tubular housing for an array of rechargeable batteries, with a fan for blowing air through air gaps defined between the housing and the batteries walls.

With reference now to the drawings, and particularly to FIGS. 1-4, there is shown an electric vehicle 11 having an array of batteries 13 carried within an elongated tunnel or tubular housing 15 that extends centrally along the vehicle's length. The housing has a generally rectangular cross section, with a generally flat base 17 and a channel-shaped top 19 secured together by screws 21. The batteries are arranged within the housing in two side-by-side rows, each row including an upper tier 23 and a lower tier 25. The housing is sized such that longitudinally-extending air gaps 27a, 27b and 27c are defined between the housing and the left row, between the two rows, and between the right row and the housing, respectively.

The batteries 13 are all of the lead-acid type, which are commonly used as power sources for electric vehicles of this general kind. Each battery has a rectangular cross section, with five separate cells arranged in adjacent relationship along the battery's longitudinal axis. Two terminal posts 29 project upwardly from the top side of each battery, and the batteries are connected together in series to provide a voltage level of about 350 to 400 volts.

During recharging of the batteries 13, an exothermic reaction occurs that can, in some circumstances, heat the batteries to a point where damage could occur unless steps are taken to cool them. Accordingly, a fan 31 is provided to blow air longitudinally through the air gaps 27a, 27b and 27c, to maintain the battery temperatures at a level where damage is prevented. The cooling air enters the housing 15 at its forward end where a plenum 33 directs the air to the three air gaps, and the air then exits through two one-way exit valves 34 located at the housing's rearward end. Although the housing's forward end is depicted to be at the forward end of the vehicle, it will be appreciated that a reverse orientation also would be suitable. It also will be appreciated that the same structure is suitable for use in cooling batteries (e.g., nickel-zinc batteries) of the kind that generate heat during discharging, rather than recharging.

The air being directed through the longitudinally-extending air gaps 27a, 27b and 27c is heated as it makes its way past the recharging batteries 13. Thus, a greater temperature differential will exist between the air and the adjacent batteries for batteries located near the housing's forward end than near its rearward end. This ordinarily would reduce the effective cooling of the batteries located near the housing's rearward end, causing those batteries to have a higher temperature than the batteries located near the housing's forward end. The abilities of the batteries to accept electrical charge therefore would vary undesirably.

In accordance with the invention, the temperature differential between the various cells of the plurality of batteries 13 is reduced, thus making more equal the acceptance of charge by the various cells, by configuring the housing 15 such that the longitudinally-extending air gaps 27a, 27b and 27c have continuously-decreasing cross-sectional areas as they extend rearwardly. The cooling air being directed through the three air gaps therefore increases its speed as it moves rearwardly, in inverse relationship with the decreasing temperature differential between the air and the adjacent batteries. Since the cooling effect of air moving past an object increases with increasing relative speed, it will be appreciated that by narrowing the air gaps in this fashion, a substantially uniform cooling effect can be provided for all of the batteries.

With reference now to FIG. 5, there is shown a graph (not to scale) depicting: 1) the rise in temperature of the cooling air as it moves rearwardly through the air gaps 27a, 27b and 27c, and 2) the increase in heat transfer coefficient ($C_F$) of the cooling air due to its increasing speed. Ideally, the temperature differential between the cooling air and the adjacent battery multiplied by the heat transfer coefficient is maintained substantially constant along the entire length of the housing 15.

In one more detailed feature of the invention, the batteries 13 are arranged within the housing 15 such that the exterior surfaces of the separate cells of the batteries are all exposed to the air gaps 27a, 27b and 27c by equal amounts. In particular, cooling air is constrained to contact only the two side walls of each battery and specifically is prevented from contacting each battery's bottom, top, front and rear walls. This prevents individual cells, particularly the forwardmost and rearwardmost cells in each battery, from having excess contact with the cooling air. The front wall of each battery and one terminal post 29 are located immediately adjacent the forwardmost cell, and the rear wall and one terminal post are located immediately adjacent the rearwardmost cell in each battery. Preventing the cooling air from contacting these elements thus prevents undue cooling of these two cells relative to the intermediate three cells of each battery. For safety, a small amount of air is permitted to pass across the top wall of each battery, to clear away any vent gases that might escape from the battery cells.

Figure 2:
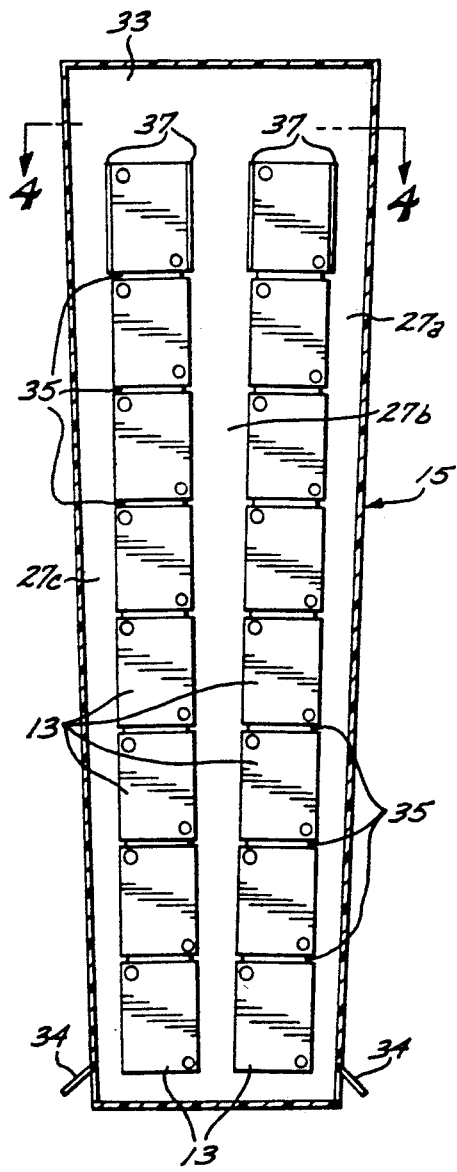
FIG. 2 is a plan view of the housing and battery array of FIG. 1, with the top of the housing removed to reveal the decreasing sizes of the air gaps, depicted in exaggerated form, as they extend from the housing's forward end to its rearward end.
Figure 3:
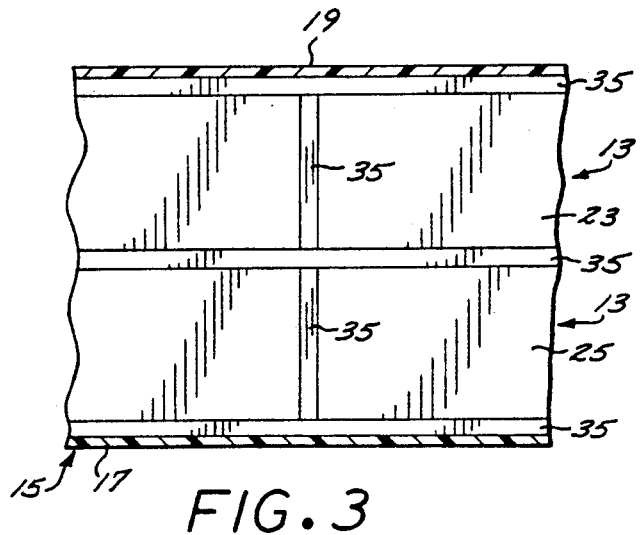
FIG. 3 is a fragmentary side sectional view of a portion of the battery array of FIG. 2, showing portions of four batteries separated from each other and from the housing by foam insulating strips.
Figure 4:
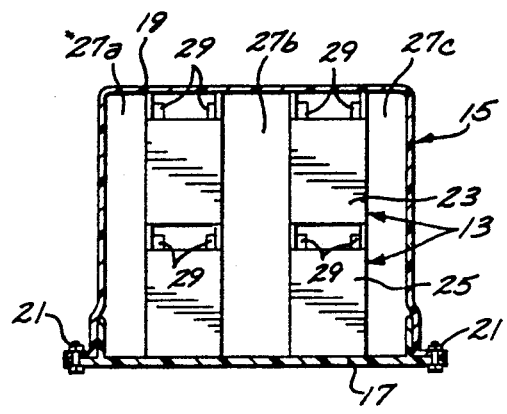
FIG. 4 is a sectional view of the housing and battery array, taken in the direction of the arrows 4—4 in FIG. 2.

With reference to FIG. 4, it will be observed that cooling air is constrained to travel only along the three air gaps 27a, 27b and 27c by placing foam rubber, heat-insulating strips 35 along the top and bottom edges of each battery 13. The foam strips extend from the housing's base 17 to the lower tier 25 of batteries, from the lower tier of batteries to the upper tier 23 of batteries, and from the upper tier of batteries to the housing's top 19. Each of these gaps is about one-half inch in size. As shown in FIGS. 2 and 3, foam rubber, heat-insulating strips also can be placed vertically between adjacent batteries in each row. Conventional foam rubber strips of the kind commonly used in the doors and windows of homes are suitable for this purpose.

The three air gaps 27a, 27b and 27c are preferably sized such that the cooling air being directed through them experiences the same temperature rise in each. The gap 27b is of course wider than the gaps 27a and 27c, because the air being directed through it is heated by both rows of batteries 13.

To supplement the temperature-equalizing effects of increasing the cooling air's speed as it moves rearwardly through the air gaps 27a, 27b and 27c, as described above, additional benefits can be provided by placing a heat-insulating sheet 37 (FIG. 2) on the opposite side walls of the four batteries 13 located at the housing's forward end. This prevents excessive cooling of these batteries.

It should be appreciated from the foregoing description that the present invention provides an inexpensive, elegant solution to the need to provide uniform cooling for all of the batteries in a battery array during recharging. A housing for carrying the rechargeable batteries is configured such that air gaps defined adjacent to the batteries, for conducting cooling air, have a continuously-decreasing cross-sectional area. The cooling air's speed thus increases as it move through the air gaps. The gaps are preferably sized so that the air's increase in speed raises its heat transfer coefficient in inverse relationship with the temperature differential between the air and the adjacent battery, the batteries are all cooled to substantially the same degree. An important benefit is that all of the cells of the batteries will accept charge at a substantially uniform rate.

Although the invention has been described in detail with reference to the presently-preferred embodiment, those skilled in the art will appreciate that various modifications can be made without departing from the invention. For example, different arrangements of batteries, in more or fewer rows than the depicted two and more or fewer tiers than the depicted two, also can be cooled by the method and apparatus of the invention. Accordingly, the invention is defined only by the following claims.

I claim:

1. Apparatus for cooling a plurality of rechargeable batteries, comprising:

a housing having a longitudinal axis extending from a forward end to a rearward end and sized to carry a plurality of rechargeable batteries of predetermined size, wherein the housing is sized such that an air gap is defined between itself and the plurality of batteries, the air gap having a cross-sectional size that continuously decreases from the housing's forward end to its rearward end; and air cooling means for transporting air through the air gap defined by the housing, from the forward end to the rearward end, the air being heated by the batteries as it is transported through the air gap and thereby cooling the batteries, wherein the speed of the air continuously increases as it is transported along the air gap, due to the air gap's continuously decreasing cross-sectional size, to enhance the air's heat transfer coefficient in inverse relationship with the temperature differential between the air and the adjacent batteries, wherein the plurality of batteries are provided with a substantially uniform cooling effect and are maintained at a more uniform temperature.

2. Apparatus as defined in claim 1, wherein:

the housing is adapted to carry a plurality of batteries of substantially identical size and shape arranged in a row from the housing's forward end to its rearward end, the batteries all having a substantially rectangular cross-sectional shape perpendicular to the housing's longitudinal axis; and air gaps are defined between the housing and opposing sides of the batteries, the air gaps having cross-sectional sizes that decrease from the housing's forward end to its rearward end.

3. Apparatus as defined in claim 2, Wherein the cross-sectional sizes of the air gaps on-opposite sides of the batteries decrease substantially uniformly from the housing's forward end to its rearward end.

4. Apparatus as defined in claim 1, wherein:

the housing is adapted to carry a plurality of batteries of substantially identical size and shape arranged in a plurality of side-by-side rows extending from the housing's forward end to its rearward end, and in a plurality of tiers in each row; and air gaps are defined between the housing and one side of each of the two end-most rows of batteries and between each adjacent pair of rows of batteries, all of these air gaps having cross-sectional sizes that decrease from the housing's forward end to its rearward end.

5. Apparatus as defined in claim 1, wherein:

the batteries each include a plurality of cells; and the housing is arranged such that each cell of each battery is exposed to the air gap by substantially the same amount.

6. Apparatus for cooling a plurality of rechargeable batteries, comprising:

a housing having a longitudinal axis extending from a forward end to a rearward end and sized to carry a plurality of rechargeable batteries of predetermined size, wherein the housing is sized such that an air gap is defined between itself and the plurality of batteries, the air gap having a cross-sectional size that decreases from the housing's forward end to its rearward end;

air cooling means for transporting air through the air gap defined by the housing, from the forward end to the rearward end, the air being heated by the batteries as it is transported through the air gap and thereby cooling the batteries, wherein the speed of the air increases as it is transported along the air gap, due to the air gap's decreasing cross-sectional size, to enhance the air's heat transfer coefficient in inverse relationship with the temperature differential between the air and the adjacent batteries, whereby the plurality of batteries are maintained at a more uniform temperature; and means for heat-insulating the portion of the battery closest to the housing's forward end that is exposed to the air gap, to reduce the cooling effect on that battery of the air being transported through the air gap and thereby further enhance maintenance of the plurality of batteries at a more uniform temperature.

7. Apparatus for cooling a plurality of rechargeable batteries, comprising:

a housing having a longitudinal axis extending from a forward end to a rearward end and sized to carry a plurality of rechargeable batteries of predetermined size, wherein the housing is sized such that an air gap is defined between itself and the plurality of batteries, the air gap having a cross-sectional size that decreases from the housing's forward end to its rearward end;

air cooling means for transporting air through the air gap defined by the housing, from the forward end to the rearward end, the air being heated by the batteries as it is transported through the air gap and thereby cooling the batteries, wherein the speed of the air increases as it is transported along the air gap, due to the air gap's decreasing cross-sectional size, to enhance the air's heat transfer coefficient in inverse relationship with the temperature differential between the air and the adjacent batteries, whereby the plurality of batteries are maintained at a more uniform temperature;

wherein the housing is adapted to carry a plurality of batteries, each battery including a plurality of cells arranged in adjacent relationship along the longitudinal axis and each battery having a forward wall, a rear wall, and two side walls; and the apparatus further includes insulating means for guiding the air being transported through the air gap only alongside the two side walls of each battery and not alongside the forward wall or rear wall of each battery, such that each cell of each battery is exposed to the air gap by substantially the same amount.

8. Apparatus as defined in claim 7, wherein the insulating means includes a plurality of plastic foam strips extending from the housing to the plurality of batteries.

9. An electric vehicle comprising:

a plurality of rechargeable batteries;

an elongated tubular housing having a longitudinal axis extending from a forward end to a rearward end and sized to carry end-to-end a plurality of rechargeable batteries of predetermined size, wherein the housing is sized such that an air gap is defined between itself and the plurality of batteries, the air gap having a cross-sectional size that continuously decreases from the housing's forward end to its rearward end; and air cooling means for transporting air through the air gap defined by the housing, from the forward end to the rearward end, the air being heated by the batteries as it is transported through the air gap, and thereby cooling the batteries, wherein the speed of the air continuously increases as it is transported along the air gap, due to the air gap's continuously decreasing cross-sectional size, to enhance the air's heat transfer coefficient in inverse relationship with the temperature differential between the air and the adjacent batteries, wherein the plurality of batteries are provided with a substantially uniform cooling effect and are maintained at a more uniform temperature.

10. An electric vehicle as defined in claim 9, wherein:

the housing is adapted to carry a plurality of batteries of substantially identical size and shape arranged in a plurality of side-by-side rows extending from the housing's forward end to its rearward end, and in a plurality of tiers in each row; and air gaps are defined between the housing and one side of each of the two end-most rows of batteries and between each adjacent pair of rows of batteries, all of these air gaps having cross-sectional sizes that decrease from the housing's forward end to its rearward end.

11. An electric vehicle as defined in claim 10, wherein the cross-sectional sizes of the air gaps all decrease substantially uniformly from the housing's forward end to its rearward end.

12. An electric vehicle as defined in claim 9, wherein:

the batteries each include a plurality of cells; and the housing is arranged such that each cell of each battery is exposed to the air gap by substantially the same amount.

13. An electric vehicle comprising:

a plurality of rechargeable batteries;

an elongated tubular housing having a longitudinal axis extending from a forward end to a rearward end and sized to carry end-to-end a plurality of rechargeable batteries of predetermined size, wherein the housing is sized such that an air gap is defined between itself and the plurality of batteries, the air gap having a cross-sectional size that decreases from the housing's forward end to its rearward end;

air cooling means for transporting air through the air gap defined by the housing, from the forward end to the rearward end, the air being heated by the batteries as it is transported through the air gap, and thereby cooling the batteries, wherein the speed of the air increases as it is transported along the air gap, due to the air gap's decreasing cross-sectional size, to enhance the air's heat transfer coefficient in inverse relationship with the temperature differential between the air and the adjacent batteries, whereby the plurality of batteries are maintained at a more uniform temperature; and means for heat-insulating the portion of the battery closest to the housing's forward end that is exposed to the air gap, to reduce the cooling effect on that battery of the air being transported through the air gap and thereby further enhance maintenance of the plurality of batteries at a more uniform temperature.

14. An electric vehicle comprising:

a plurality of rechargeable batteries;

an elongated tubular housing having a longitudinal axis extending from a forward end to a rearward end and sized to carry end-to-end a plurality of rechargeable batteries of predetermined size, wherein the housing is sized such that an air gap is defined between itself and the plurality of batteries, the air gap having a cross-sectional size that decreases from the housing's forward end to its rearward end;

air cooling means for transporting air through the air gap defined by the housing, from the forward end to the rearward end, the air being heated by the batteries as it is transported through the air gap, and thereby cooling the batteries, wherein the speed of the air increases as it is transported along the air gap, due to the air gap's decreasing cross-sectional size, to enhance the air's heat transfer coefficient in inverse relationship with the temperature differential between the air and the adjacent batteries, whereby the plurality of batteries are maintained at a more uniform temperature;

wherein the housing is adapted to carry a plurality of batteries, each battery including a plurality of cells arranged in adjacent relationship along the longitudinal axis and each battery having a forward wall, a rear wall, and two side walls; and the electric vehicle further includes insulating means for guiding the air being transported through the air gap only alongside the two side walls of each battery and not alongside the forward wall or rear wall of each battery, such that each cell of each battery is exposed to the air gap by substantially the same amount.

15. An electric vehicle as defined in claim 14, wherein the insulating means includes a plurality of plastic foam strips extending from the housing to the plurality of batteries.

16. A method for cooling a plurality of rechargeable batteries, comprising the steps of:

providing a housing having a longitudinal axis extending from a forward end to a rearward end, the housing being adapted to carry a plurality of batteries and being sized to define an air gap between itself and the plurality of batteries, the air gap having a cross-sectional size that continuously decreases from the housing's forward end to its rearward end; and transporting air through the air gap defined by the housing, from the forward end to the rearward end, the air being heated by the batteries as it is transported through the air gap, and thereby cooling the batteries, wherein the speed of the air continuously increases as it is transported along the air gap, due to the air gap's continuously decreasing cross-sectional size, to enhance the air's heat transfer coefficient in inverse relationship with the temperature differential between the air and the adjacent batteries, wherein the plurality of batteries are provided with a substantially uniform cooling effect and are maintained at a more uniform temperature.

17. A method as defined in claim 16, wherein:

the housing provided in the step of providing is adapted to carry a plurality of batteries of substantially identical size and shape arranged in a row from the housing's forward end to its rearward end, the batteries all having a substantially rectangular cross-sectional shape perpendicular to the housing's longitudinal axis; and the step of providing includes a step of providing air gaps between the housing and opposing sides of the batteries, the air gaps having cross-sectional sizes that decrease from the housing's forward end to its rearward end.

18. A method as defined in claim 17, wherein the cross-sectional sizes of the air gaps provided in the step of providing decrease substantially uniformly from the housing's forward end to its rearward end.

19. A method as defined in claim 16, wherein:
the batteries each include a plurality of cells; and
the housing provided in the step of providing includes a step of arranging the housing such that each cell of each battery is exposed to the air gap by substantially the same amount.

20. A method for cooling a plurality of rechargeable batteries, comprising the steps of:
providing a housing having a longitudinal axis extending from a forward end to a rearward end, the housing being adapted to carry a plurality of batteries and being sized to define an air gap between itself and the plurality of batteries, the air gap having a crosssectional size that decreases from the housing's forward end to its rearward end;
transporting air through the air gap defined by the housing, from the forward end to the rearward end, the air being heated by the batteries as it is transported through the air gap, and thereby cooling the batteries, wherein the speed of the air increases as it is transported along the air gap, due to the air gap's decreasing cross-sectional size, to enhance the air's heat transfer coefficient in inverse relationship with the temperature differential between the air and the adjacent batteries, whereby the plurality of batteries are maintained at a more uniform temperature;
wherein the batteries each include a plurality of cells;
the housing provided in the step of providing includes a step of arranging the housing such that each cell of each battery is exposed to the air gap by substantially the same amount;
and wherein the housing provided in the step of providing is adapted to carry a plurality of batteries, each battery including a plurality of cells arranged in adjacent relationship along the longitudinal axis and each battery having a forward wall, a rear wall, and two side walls; and
the method further includes a step of guiding the air being transported through the air gap only alongside the two side walls of each battery and not alongside the forward wall or rear wall of each battery, such that each cell or each battery is exposed to the air gap by substantially the same amount.

* * * * *